United States Patent
Rigola et al.

(10) Patent No.: US 6,296,825 B1
(45) Date of Patent: Oct. 2, 2001

(54) INORGANIC POLYMER BASED ON ALUMINUM AND SILICON

(75) Inventors: Jeannine Rigola; Olivier J. Poncelet, both of Chalon sur Saone; Didier J. Martin, Givry, all of (FR)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/115,879

(22) Filed: Jul. 15, 1998

(30) Foreign Application Priority Data

Aug. 8, 1997 (FR) .................................................. 97 10407

(51) Int. Cl.[7] .................................................. C01B 33/26
(52) U.S. Cl. .................................. 423/330.1; 423/327.1; 423/328.1; 423/328.2
(58) Field of Search .......................... 423/330.1, 327.1, 423/328.2, 329, 328.1

(56) References Cited

U.S. PATENT DOCUMENTS

| 4,152,404 | 5/1979 | Farmer | 423/329 |
|---|---|---|---|
| 4,252,779 | 2/1981 | Farmer | 423/327 |
| 5,427,853 | * 6/1995 | Powell et al. | 428/357 |
| 5,714,309 | 2/1998 | Poncelet | 430/527 |
| 5,888,711 | * 3/1999 | Poncelet | 423/328.1 |
| 6,004,527 | * 12/1999 | Murrell et al. | 423/328.2 |

FOREIGN PATENT DOCUMENTS

| 250 154 | 12/1987 | (EP) . |
|---|---|---|
| 2740465 | 10/1995 | (FR) . |
| 2025384A | 6/1979 | (GB) . |
| 96/13459 | 5/1996 | (WO) . |

OTHER PUBLICATIONS

S.M. Barrett, P.M. Budd, & C. Price The Synthesis and Characterizarion of Imogolite Sep. 25, 1990.

* cited by examiner

Primary Examiner—Ngoc-Yen Nguyen

(57) ABSTRACT

An inorganic polymeric aluminosilicate material and a method for preparing the same, are disclosed. Instead of having a fibrous structure, the material has a structure consisting of spindles with a length in the range of from 10 to 100 $\mu$m and a width in the range of from 2 to 20 $\mu$m. This polymeric aluminosilicate can be used for the production of antistatic layers.

3 Claims, 4 Drawing Sheets

20 μm

INORGANIC POLYMER BASED ON ALUMINUM AND SILICON

FIELD OF THE INVENTION

The present invention concerns a novel polymeric alumino-silicate and a method for preparing it.

Polymeric alumino-silicates in a fibrous form are known. A fibrous, tubular crystallized alumino-silicate known as imogolite is present in the impure natural state in volcanic ash and in certain soils.

U.S. Pat. Nos. 4,152,404 and 4,252,779 of Farmer describe an inorganic material similar to natural imogolite. This inorganic material is synthesized by causing silica or a soluble silicate to react with an aluminium compound so as to form a complex hydroxyaluminium silicate in aqueous solution with a pH of 3.2–5.5, and then effecting a digestion of this complex at a pH of 3.1–5.0 so as to form a colloidal dispersion of the inorganic material. This inorganic material can be used as a molecular sieve, a catalyst support, a coagulant or an adsorbent. By evaporating the colloidal solution of imogolite on a flat surface, it is possible to form films which can be used as membranes. If the material is not isolated from its colloidal solution, it can be used as a flocculent, a substance for promoting hydrophilicity or a thickening agent.

European Patent 0 250 154 describes a photographic product, comprising a polymer surface on which a layer comprising a gelled lattice of inorganic particles, preferably oxide particles, has been caused to adhere. According to this patent, the gelled lattice forms a porous layer with voids between the inorganic oxide particles. This porous layer is obtained from a dispersion or suspension of finely divided particles in a liquid medium. The oxide particles can be boehmite (aluminium oxide), silica or a silica gel coated with alumina. This gelled lattice is formed by the aggregation of colloidal particles bonded together in order to form a porous three dimensional lattice. This gelled lattice provides a substratum endowed with antistatic properties.

European Patent Application 0 741 668 describes a homogeneous polymeric alumino-silicate having antistatic properties, as well as a method for obtaining this alumino-silicate with a high degree of purity. According to European Patent Application 0 741 668, the method for obtaining the polymeric alumino-silicate comprises:

(a) the treatment of a mixed aluminium and silicon alkoxide with an aqueous alkali at a pH in the range of 4 to 6.5, maintaining the Al molar concentration between $5 \times 10^{-4}$ and $10^{-2}$ M and the Al/Si molar ratio between 1 and 3;

(b) the heating of the mixture obtained from step (a) to a temperature below 100° C. in the presence of silanol groups, for a sufficient period for obtaining a complete reaction and the formation of an inorganic polymer, and (c) the elimination of the residual ions from the reaction medium.

The inorganic polymer is a fibrous alumino-silicate of formula $Al_xSi_yO_z$ where x is in the range of from 1 to 3 and z is in the range of from 1 to 10.

The object of the present invention is a polymeric alumino silicate, derived from the polymeric alumino-silicate of aforementioned Patent Application 0 741 668, and a method for obtaining this derived material.

The material of the invention is a polymeric aluminosilicate material of formula $Al_xSi_yO_z$, in which x:y is a number from 1 to 3 and z is a number from 1 to 10, this material being substantially comprised of spindles with a length L of between 10 and 100 μm, a maximum width 1 of between 2 and 20 μm, the ratio L:1 being a number from 3 to 10.

Preferably, x:y is a number from 1.5 to 2.5, z a number from 2 to 6, L is between 20 and 80 μm and 1 is between 5 and 15 μm.

The terms "substantially comprised" mean that the material comprises at least 95 weight % and preferably at least 99 weight % of said alumino silicate spindles, based in the total weight of the material.

The method for obtaining the material of the invention comprises the steps of:

(a) treating a mixture of an aluminium compound and a silicon compound, both hydrolysable, or a hydrolysable mixed compound of aluminium and silicon, by an aqueous alkali, at a pH in the range of 4 to 6.5, maintaining the Al concentration between $5 \times 10^{-4}$ M and $10^{-2}$ M and the Al:Si molar ratio between 1 and 3;

(b) heating the mixture obtained from (a) at a temperature below 100° C. in the presence of silanol groups, for a period sufficient for obtaining, by means of a complete reaction, the formation of a polymeric alumino-silicate in solution;

(c) concentrating the solution obtained from (b) so as to obtain an Al+Si concentration of at least approximately 1.5 g/l, (d) settling the concentrated solution obtained from step (c) to produce 2 phases, and collecting the upper (less dense) phase, which represents at least 90% and preferably at least 95% by weight polymeric aluminosilicate with a spindle morphology.

DETAILED DESCRIPTION OF THE INVENTION

The steps (a) and (b) of the method are identical to those described in the aforementioned European Patent Application 0 741 668. The product obtained at the end of step (d) can then be concentrated further in order to be transformed into a gel, which can itself be freeze-dried, in the form of a dry powder. This powder can be put back in solution and, in this case, the material put back in solution still has a spindle morphology. It is also possible, after step (d), to eliminate the ions and the small molecules present in the concentrated solution and, essentially from the alkali used. This elimination can be carried out by dialysis.

Figure 2:
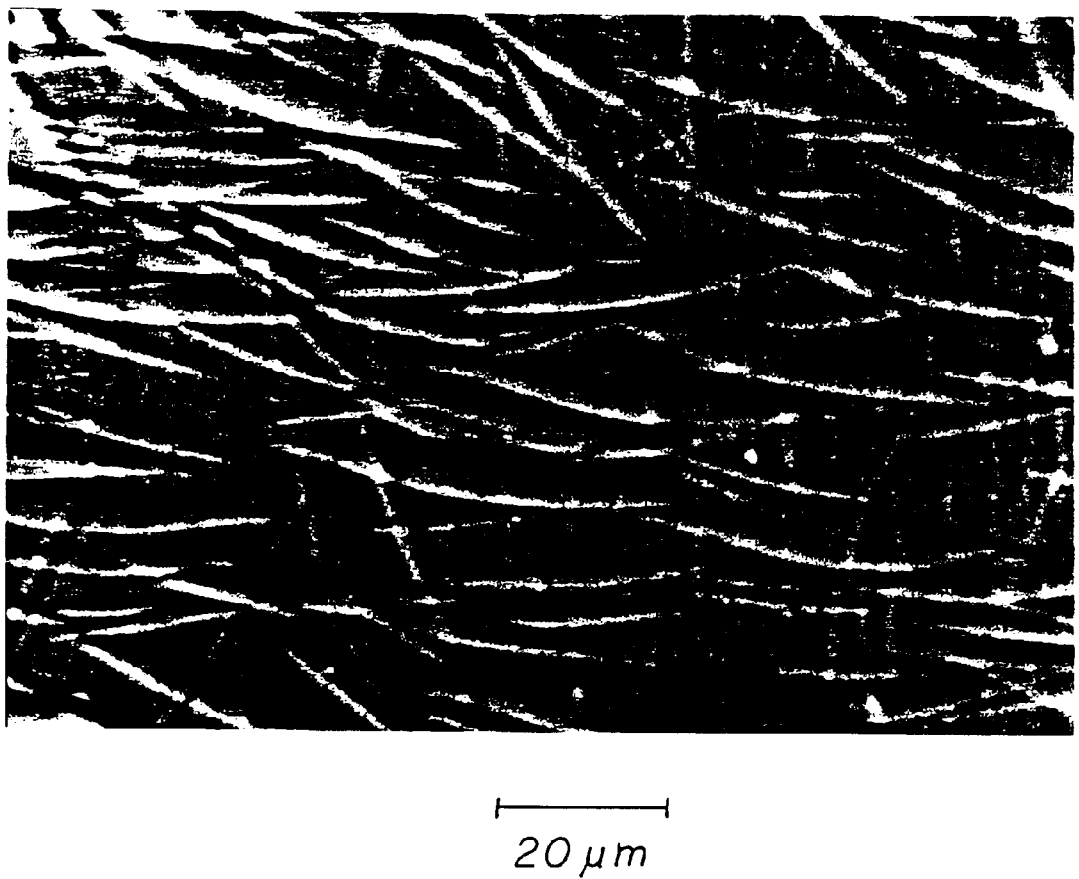
FIGS. 2–3 depict electron microscopy photographs showing the structure of the material of the invention.
Figure 3:
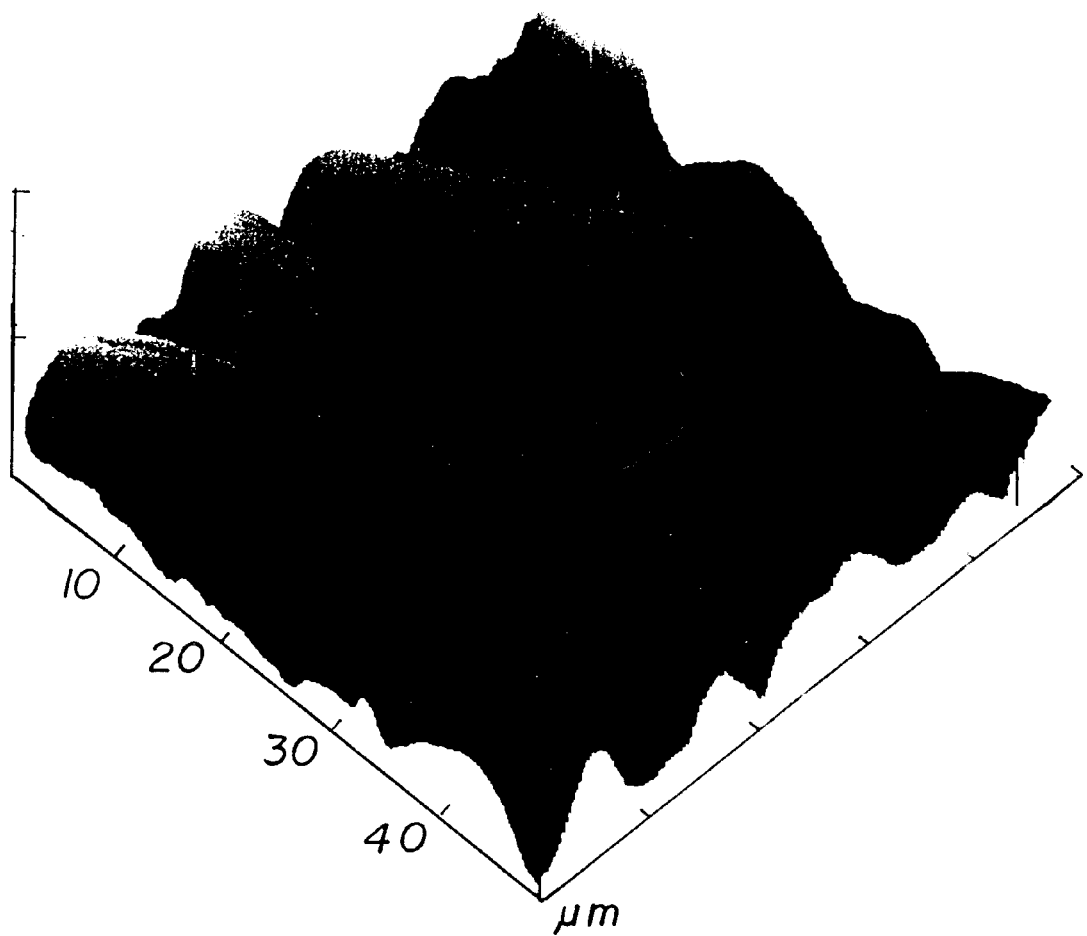

The novel material according to the invention is in the form of spindles. This morphology can be revealed by optical microscopy or atomic force microscopy (AFM), as the photographs in FIGS. 2–3 show.

The method of the invention provides, as indicated, a so-called "upper" phase, consisting of the polymeric alumino-silicate in spindle form and a so-called "lower" phase, which consists of the fibrous polymeric aluminosilicate described in the aforementioned European Patent Application 0 741 668. These two materials have the same basic formula $Al_xSi_yO_z$ indicated above, confirmed by the same Raman spectrum, and are distinguished from each other by various characteristics such as the viscosity or wetting angle, as shown by the following examples.

According to one embodiment, the solution obtained at b) is concentrated by ultrafiltration on a membrane. The solution obtained at (b) has a polymeric alumino-silicate (Al+Si) concentration which is generally below 0.5 g/l. It is necessary to concentrate it so that the alumino-silicate content is greater than 1.5 g/l and preferably greater than 1.7 g/l. It is possible to use either a tangential ultrafiltration module in which the solution is pumped at high speed along the membrane, or a frontal ultrafiltration module in which the solution is pumped, at a greater pressure, perpendicular to the membrane. The ultrafiltration membranes which can be used for this purpose are for example cellulosic membranes such as the 10 KD membrane sold by AMICON, polyethersulphur membranes such as the membrane 100 KD sold by MILLIPORE, or polyacrylonitrile membranes.

According to another embodiment, the solution obtained at the end of the above step (b) can be concentrated by distillation.

A preferred embodiment consists of concentrating the solution obtained at step (b) by tangential ultrafiltration on a cellulosic membrane. Such an embodiment is depicted schematically in FIG. 1. According to this diagram, the solution 10 coming from step (b) is sent by pumping (pumping unit 12 with pump 13 and flowmeter) into an ultrafiltration module 14 fitted with a spiral membrane. The permeate is discharged through the pipe 15 and the enriched retentate of the desired phase of the alumino-silicate is sent at 10 through the duct 16. The inlet pressure is between 0.5 and 5.0 bars and the concentration factor is between 30 and 60%, advantageously around 40%.

EXAMPLE 1

A solution of 5 liters of $AlCl_3$, $6H_2O$ (7.3 g/l) and a solution of 5 l of $Si(OCH_3)_4$ (2.56 g/l) in osmosed water were prepared. These solutions were mixed and 370 ml of NaOH 1M were added dropwise. The mixture was kept overnight under stirring. The pH was adjusted to 6.8 with NaOH and a gel was obtained. This gel was diluted in 5 l of osmosed water, acidified by 25 ml of a mixture of HCl 1M and $CH_3CO_2H$ 2M. This mixture was stirred until a transparent solution was obtained. The transparent solution was diluted with 11 liters of osmosed water, and then heated at 96° C. for 5 days in the presence of finely divided silica. A solution of 0.3 g/l of polymeric alumino-silicate was obtained.

Figure 1:
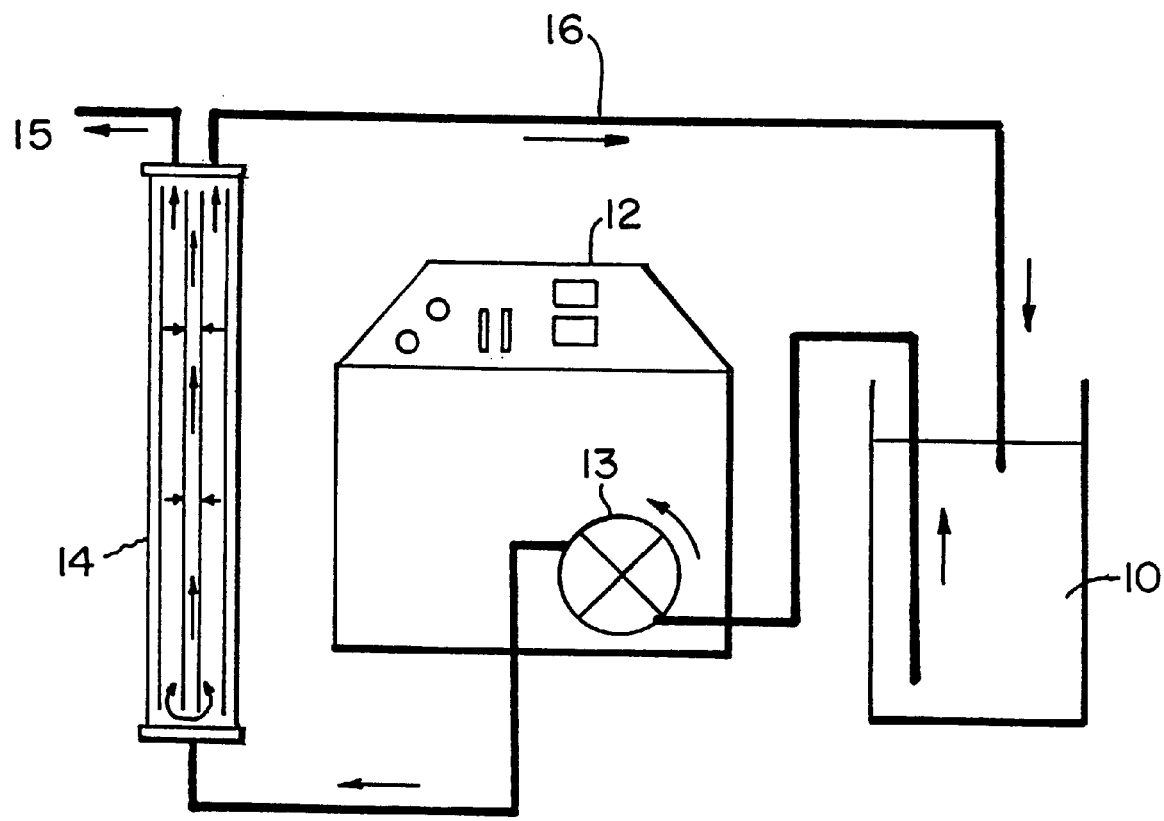
FIG. 1 shows a device for obtaining the material of the invention.

Using a tangential ultrafiltration module as depicted in FIG. 1, the polymeric alumino-silicate solution was concentrated. The ultrafiltration module 14 comprised a regenerated cellulose wound membrane 10 KD sold by AMICON. Ultrafiltration was carried out at a pressure of 0.7 bar. After concentration, the retentate comprised 4.4 g/l of aluminosilicate.

After this retentate was allowed to stand overnight, two separate phases were formed. The less dense upper phase was separated from the lower phase.

Characterisation of the two phases gave the following results:

| | Al:Si ICP | Al:Si TEM | Refraction index | Water adhesion | Decane adhesion | Resistivity G ohm/m² |
|---|---|---|---|---|---|---|
| Upper phase containing spindles (invention) | 1.93 | 2.11 | 1.335 | yes | yes | 3 |
| Fibrous lower phase | 2.01 | 2.14 | 1.335 | no | yes | 11 |

A sample of ESTAR® polyester film support was coated at 100 mg/m², with each of the two phases and then examined under optical microscopy and AFM. Under AFM (Atomic Force Microscopy) microscopy, a fine tip took a reading on the surface of the material by contact. A relief image of the deposition of polymeric alumino-silicate was obtained. The optical and AFM microscopy photographs obtained are shown respectively in FIGS. 2–3.

The Al:Si ratio was measured both by atomic emission spectroscopy with inductive coupling plasma (ICP) and by EDX spectrometry.

The water/decane adhesion was evaluated by coating an ESTAR® polyethylene terephthalte support film with a layer of the concentrated solution and then by spraying water or decane onto the coated support.

The resistivity was measured as follows: calibrated strips (2.7 cm×3.5 cm) of ESTAR support were produced, coated with the concentrated solution at 100 mg/m²; these calibrated strips were placed on electrodes between which a voltage was established whilst maintaining constant humidity and temperature (HR 30%—23° C.).

Figure 4:
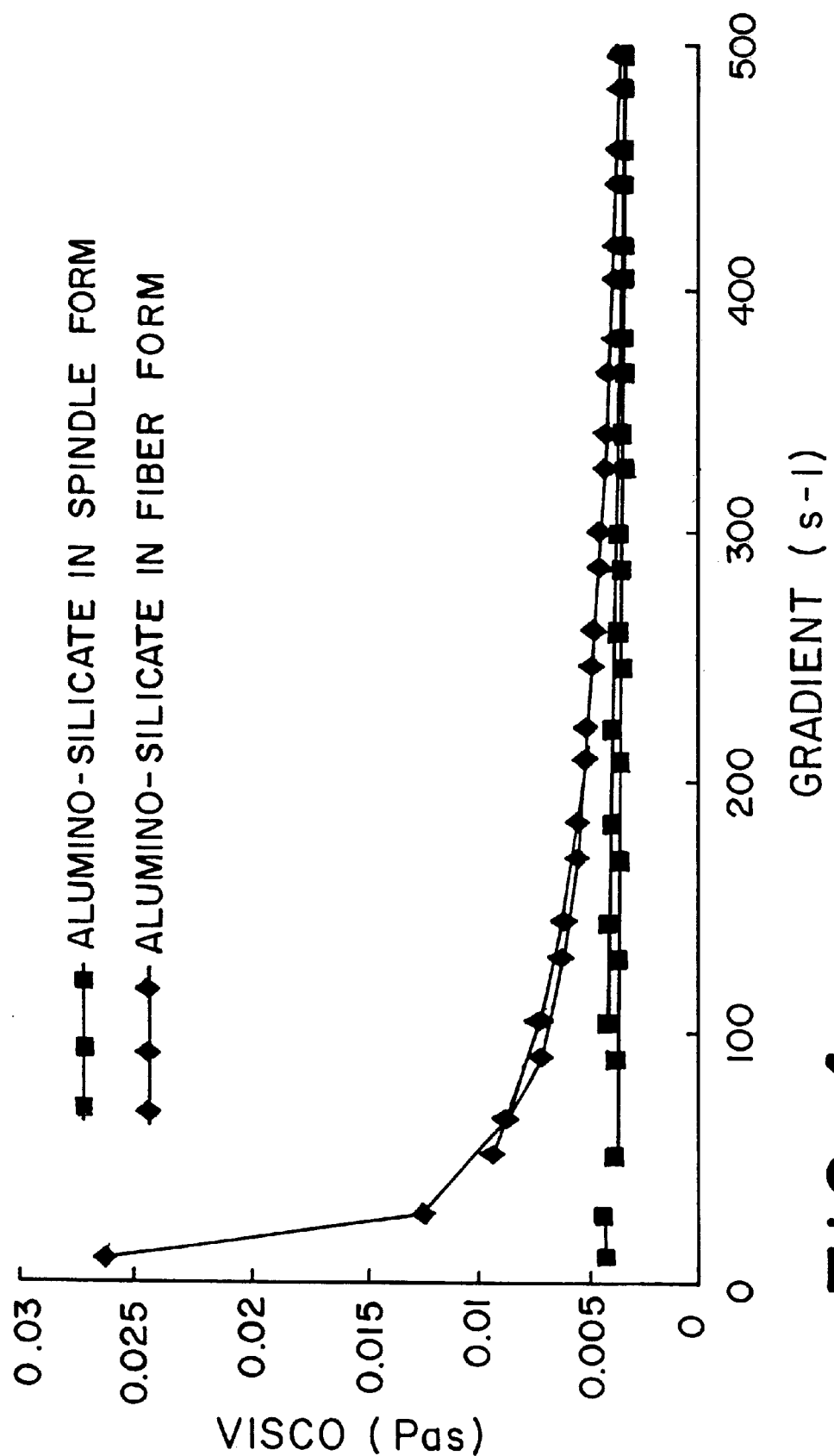
FIG. 4 shows the difference in viscosity between the two materials (bunches versus fibres).

The viscosity was also measured on a CONTRAVES 115 flowmeter as a function of the stresses applied. The speed of flow curves depicted in FIG. 4, for the solutions of aluminosilicate in spindle form and alumino-silicate in fibrous form, showed that the spindle phase had a viscosity greater than the fibrous phase. Given its resistivity, wettability and viscosity, the solution of polymeric alumino-silicate in spindle form can be used for antistatic layers intended for example for photographic materials.

What is claimed is:

1. A method for preparing an alumino-silicate material comprising the steps of:
   (a) treating a mixture of an aluminium compound and a silicon compound, both hydrolysable, or a hydrolysable mixed compound of aluminium and silicon, by means of an aqueous alkali solution, at a pH of between 4 and 6.5, maintaining the Al concentration between $5 \times 10^{-4}$ M and $10^{-2}$ M and the Al:Si molar ratio between 1 and 3;
   (b) heating the mixture obtained from (a) to a temperature below 100° C. in the presence of silanol groups, for a period sufficient for obtaining, by means of a complete reaction, the formation of a polymeric alumino-silicate in solution;
   (c) concentrating the solution obtained from step (b) so as to obtain an Al+Si concentration of at least approximately 1.5 g/l,
   (d) settling the concentrated solution of step (c) to allow the formation of two phases, an upper phase containing polymenic alumino-silicate of which at least 90% by weight is in the form of spindles and a lower phase containing polymeric alumino-silicate in fibrous form, whereby the spindle form and the fibrous form are effectively seperated by the two phases, collecting the upper phase of lower density; and (e) concentrating the upper phase to obtain a polymeric alumino-silicate material; wherein the alumino-silicate spindles are of formula $Al_xSi_yO_z$ in x:y is a number from 1 to 3 and z is a number from 1 to 10, and the spindles have a length L of between 10 and 100 µm, a maximum width 1 of between 2 and 20 µm, the ratio L:1 being a number from 3 to 10.

2. The method of claim 1, wherein at step (c), the solution is concentrated by ultrafiltration.

3. The method of claim 2, wherein at step (c), the solution is concentrated by tangential ultrafiltration.

* * * * *